April 9, 1929.   H. S. JANDUS   1,708,623
VEHICLE BUMPER
Filed Nov. 29, 1927   3 Sheets-Sheet 1
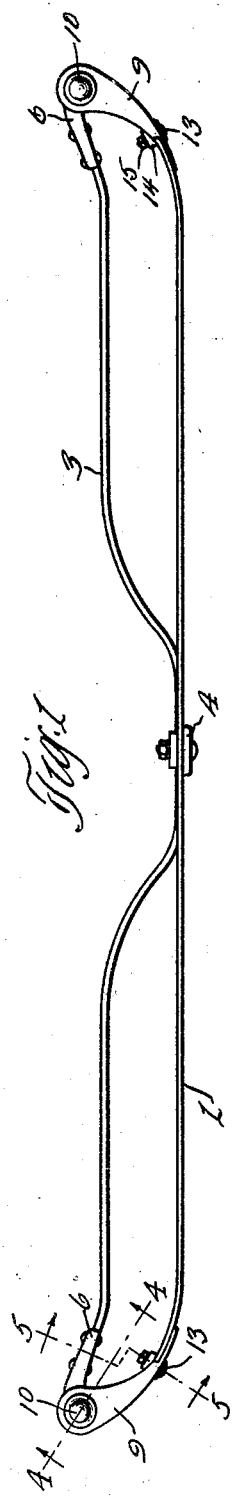
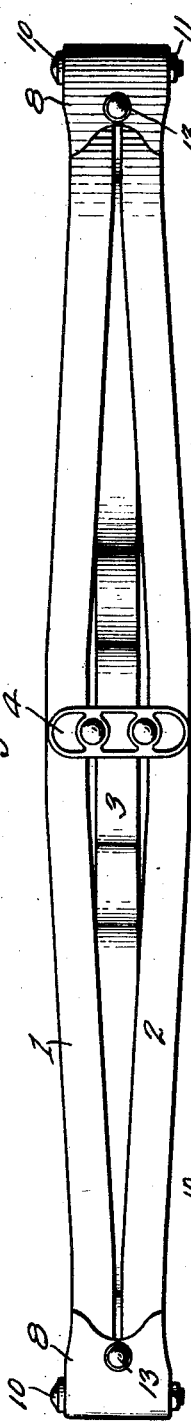
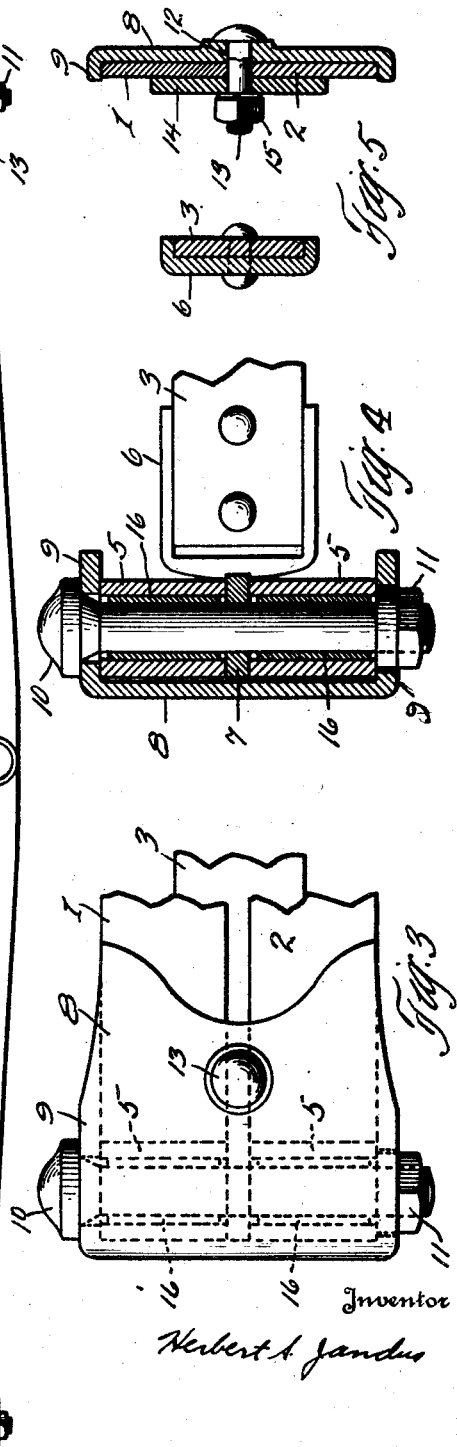
Inventor
Herbert S. Jandus
Hull, Brock and West  Attorney

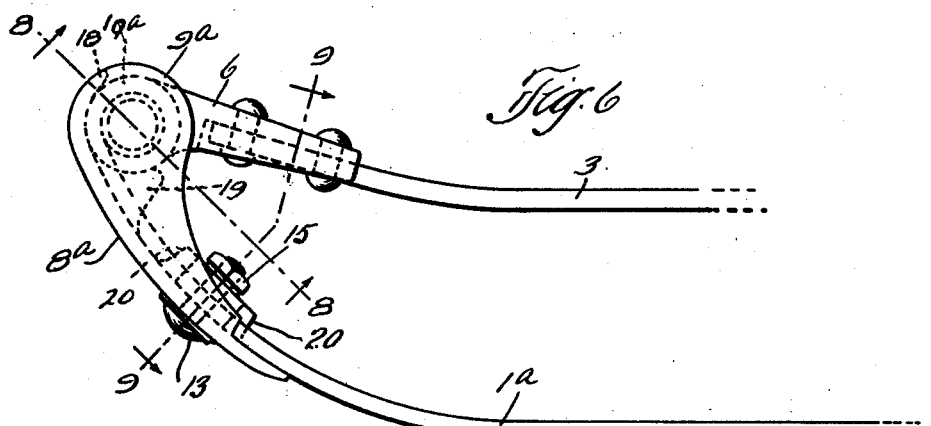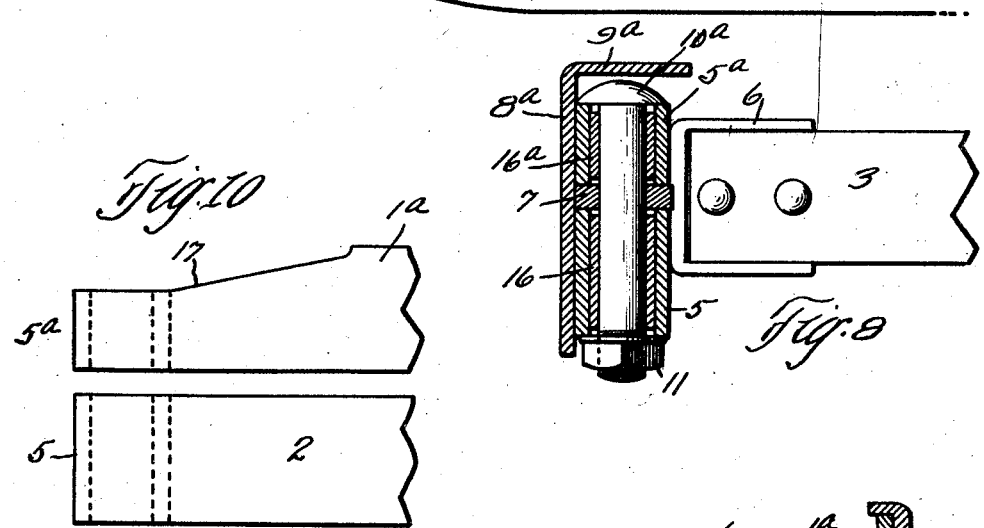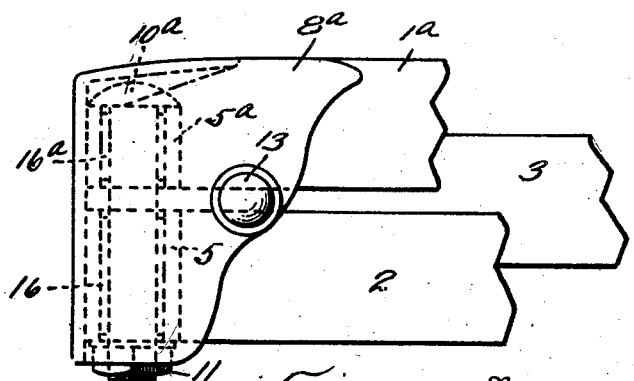

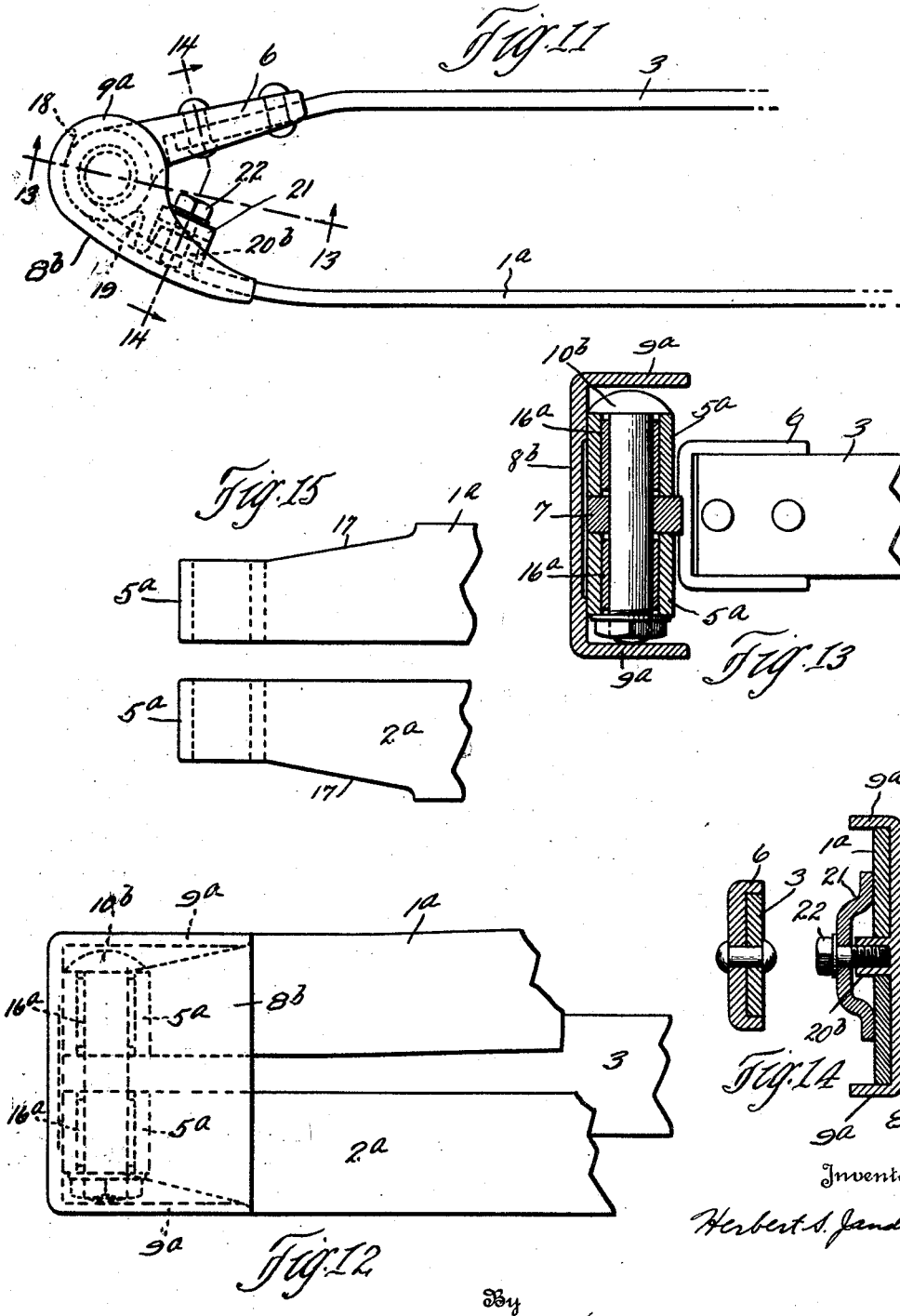

Patented Apr. 9, 1929.

1,708,623

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

VEHICLE BUMPER.

Application filed November 29, 1927. Serial No. 236,451.

This invention relates to automobile bumpers and more particularly to a mask plate for covering the connections between the bars at the ends of the bumper. An object of the invention is to produce a bumper having a pivotal end construction of increased strength. A further object is to produce a bumper of suitable end construction to give the maximum protection and one which is at the same time attractive in appearance. A further object is to produce a mask plate to be applied to a pivotal connection at the end of the bumper.

Further and more or less limited objects will be apparent from the following description, from the drawings and from the use of the articles covered by the appended claims.

In the drawings Fig. 1 represents a plan view of a bumper embodying my invention; Fig. 2 represents a front elevation of the bumper shown in Fig. 1; Fig. 3 is a detailed fractional front elevation of the end of the bumper shown in Fig. 2; Fig. 4 is a section taken on line 4—4 of Fig. 1; Fig. 5 is a section taken on line 5—5 of Fig. 1; Fig. 6 is a detailed fractional plan view of the end of a bumper showing a modified form of my invention; Fig. 7 is a fractional detailed front elevation of the end of the bumper shown in Fig. 6; Fig. 8 is a section taken on line 8—8 of Fig. 6; Fig. 9 is a section taken on line 9—9 of Fig. 6; Fig. 10 is a detailed front elevation of the ends of the impact bars used in the bumper shown in Fig. 6; Fig. 11 is a detailed fractional plan view of a bumper showing a modified form of my invention; Fig. 12 is a fractional front elevation of the bumper shown in Fig. 11; Fig. 13 is a section taken on line 13—13 of Fig. 11; Fig. 14 is a section taken on line 14—14 of Fig. 11; and Fig. 15 is a fractional front elevation of the ends of the impact bars used in the bumper shown in Fig. 11.

In the description and claims, the impact bars will be considered as the front of the bumper and the terms "front" and "rear" will be used in view of this assumption. It is not intended, however, to limit the use of my invention to any particular position on the bumper.

Of the reference characters shown in the drawing 1 and 2 indicate the upper and lower impact bars of a bumper of the general type shown and described in the McGregor Patent No. 1,372,154 issued March 22, 1921. The back bar 3 is connected at its ends to the ends of the impact bars and connected to, and between, the impact bars 1 and 2 by means of the clamp 4. Each of the impact bars has an eye 5 at each end and the back bar 3 has a pivot plate 6 fixed to each end, each such plate being formed to fit around the edges of an end of the rear bar and having a horizontally projecting portion 7 with an aperture therein.

The mask plate 8 is adapted to bear upon the front of the impact bars 1 and 2 and has flanges 9, 9 extending rearwardly over the edges of the bars 1 and 2 and the eyes at the ends thereof. These flanges have apertures therein in alignment with each other. The outer end of the mask plate extends around the end of the bars a sufficient distance to cover these portions.

In assembling the bumper the pivot plate 6 is placed between the aligned eyes at the ends of the impact bar so that the aperture therein is in alignment with such eyes. The mask plate 8 is applied so that the apertures in the flanges 9, 9 are in alignment with the eyes in the ends of the bumper bars and the aperture in the plate 7 and a bolt 10 is passed through the aligned eyes and aperture and is tightened by means of a nut 11. The mask plates 8 each have an aperture 12 in its front surface through which the bolt 13 is adapted to pass. The bolt 13 passes through the space between the impact bars and, co-acting with the mask plate 8, the rear plate 14 and the nut 15 holds the mask plate against the impact bars. The sleeves 16 may be placed within the eyes 5 before assembling the several parts.

The mask plate 8 is held against longitudinal movement by means of the flanges 9, 9 and the apertures therein surrounding the bolt 10 and it is prevented from pivoting around such bolt by the clamping action of the bolt 12 and the rear plate 14. This construction permits the impact and rear bars to operate pivotally with respect to each other and the mask plate strengthens the end construction and improves the appearance of the bumper.

In the modified forms shown in Figs. 6 to 15 parts which are alike will be indicated by like numerals.

In the modification shown in Figs. 6 to 10 the upper impact bar 1ª is cut down at its end portion as shown at 17 and has a short eye 5ᵃ at its end and may have a short sleeve 16ᵃ therein. In this construction a shorter bolt 10ᵃ may be used since it does not pass through the flange 9ᵃ of the mask plate 8ᵃ.

As shown more clearly in Fig. 6 the front face of the mask plate 8ᵃ extends part way around the eye 5ᵃ to the position indicated at 18. Upon the rear surface of the mask plate 8ᵃ there is provided a projection 19 adapted to extend between the impact bars 1ᵃ and 2 and to bear upon the surface of the plate 7. There are also provided projections 20, 20 extending between the impact bars 1ᵃ and 2 and adapted to keep the plate 14 from turning.

In this modification the bolt 10ᵃ does not pass through the flange 9ᵃ and the bar 1ᵃ is cut down so that the smooth line of the impact section may be maintained. The mask plate is held against longitudinal movement by the lug 19 and by the end portion 18 of the front surface of the mask plate, and it is clamped to the impact bars by means of the bolt 13 passing through the mask plate 8ᵃ and the rear plate 14.

In the modification shown in Figs. 11 to 15 the impact bars 1ᵃ and 2ᵃ are each cut down as indicated at 17 and have shortened eyes 5ᵃ and may have shortened sleeves 16ᵃ therein. Flanges 9ᵃ extend rearwardly above and below the impact bars 1ᵃ and 2ᵃ and the eyes therein. The bolt 10ᵇ passing through the eyes 5ᵃ and the aperture in the plate 7, is enclosed within the mask plate and does not project through either of the flanges 9ᵃ. The front surface of the mask plate 8ᵇ is extended around the outside of the eyes 5ᵃ to the point indicated at 18 and a lug 19 projecting between the impact bars 1ᵃ and 2ᵃ provides a surface adapted to bear upon the surface of the plate 7. A lug 20ᵇ projecting between the impact bars 1ᵃ and 2ᵃ has a threaded hole therein to receive the shank of a cap screw 22. The rear plate 21 is shown as bent to bear upon the rear surfaces of the impact bars 1ᵃ and 2ᵃ and has an aperture therein for the shank of the screw 22.

The reduced ends of the impact bars used in this modification allow the use of a mask plate in which the horizontal flanges are in line with the upper and lower edges of the impact bars, thus providing a continuous unbroken line. The mask plate 8ᵇ is held against lateral movement by the lug 19 and the portion 18 of the front surface of the plate. The rear plate 21 together with the cap screw 22 threaded into the projection 20ᵇ of the mask plate holds the latter in engagement with the front surfaces of the impact bars.

The sleeves 16 and 16ᵃ may be omitted or they may be replaced by suitable washers adapted to fit within the space between the shank of the bolt and the inner surface of the eye and each having a flange adapted to fit over the upper or lower edge of the eye. It is apparent also that the sleeve or washer may be omitted entirely and the apertures and eyes made to fit the shank of the bolt.

It is apparent that my invention may be used with bumpers of varying construction and appearance and it is not intended to hereby limit its use to the particular bumper herein shown and described, it being applicable to use wherever a pivotal connection between the bars is used.

In the construction I have shown the pivotal action between the impact and rear bars is not interfered with but the pivotal construction is strengthened and the appearance of the bumper is made more attractive.

Having thus described my invention, what I claim is:—

1. The combination with a vehicle bumper having pivotally connected impact and rear bars, of a mask plate adapted to conceal the ends of said bars at the pivotal connections.

2. The combination with a bumper impact section and an auxiliary section pivotally connected thereto, of a mask plate adapted to extend over and conceal the eyes and pin in such pivotal connection.

3. A mask plate comprising a plate having a surface adapted to bear upon the front surfaces of impact bars of a bumper and extending around portions of eyes at the ends thereof, a lug projecting from the rear surface of said plate and adapted to bear upon the inner surface of said eyes, and means for clamping said plate to the impact bars.

4. A bumper comprising an impact section made up of bars having the end portions of reduced width and having eyes in such end portions, a rear bar pivotally connected to such impact section by means of a bolt passing through said eyes and through eyes at the ends of the rear bar, a mask plate adapted to enclose the pivotal construction at the ends of the bumper, and means for clamping said mask plate to the impact bars.

5. A mask plate for the end of a bumper comprising a plate adapted to bear upon surfaces of vertically spaced bars, a portion of said plate extending around the end of the bumper, a lug projecting between said bars and adapted to prevent outward longitudinal movement of the plate, and means for clamping the plate to the bars.

6. In a vehicle bumper the combination, with impact bars spaced apart at their end portions and a rear bar connected to said impact bars, of a plate adapted to bear upon the surfaces of said impact bars, said plate having a portion adapted to bear upon the end portions of said bars and providing means for preventing its outward longitudinal movement and means for clamping said plate to said bars.

7. In a vehicle bumper the combination, with bars spaced apart at their end portions, of a plate adapted to bear upon surfaces of said bars, said plate having a portion adapted to bear upon the ends of the bars and a lug adapted to extend between the bars and prevent longitudinal movement of the plate, and means for clamping said plate to the bars.

8. In a vehicle bumper the combination, with impact bars having their end portions on the same vertical plane, of a plate adapted to bear upon the surfaces of said impact bars, said plate providing means for preventing its longitudinal movement on said bars, and means for clamping said plate to said bars.

9. In a vehicle bumper the combination, with impact bars having their end portions in the same vertical plane, of a plate adapted to bear upon the surfaces of said impact bars and having flanges adapted to extend over the outer edges of said bars, said plate being provided with means for preventing its longitudinal movement on said bars, and clamping means for drawing said plate toward said bars.

10. In a vehicle bumper the combination, with a pair of bars vertically spaced at their end portions, of a plate adapted to bear upon the front and end surfaces of said bars, said plate having rearwardly extending flanges adapted to extend over edges of the bars and a lug adapted to extend between the bars and prevent longitudinal movement of said plate on said bars, and means for drawing said plate toward said bars.

11. In a vehicle bumper, the combination with a pair of bars vertically spaced and pivotally connected to a rear bar at their end portions, of a plate adapted to bear upon the front and end surfaces of said bars, said plate having a laterally extending flange adapted to extend over the pivotal connection at the end of the bars and having means for preventing longitudinal movement of the plate on said impact bars, and means for drawing said plate toward said bars.

12. In a vehicle bumper the combination, with impact bars having their end portions spaced vertically and pivotally connected to a rear bar, of a plate adapted to bear upon front and end surfaces of said impact bars, said plate having a lug projecting therefrom and adapted to extend between said impact bars and bear upon the inner end portion of said rear bar, and means for clamping said plate to said impact bars.

13. The combination with a pair of bumper bars having portions spaced apart and an auxiliary bar connected to such spaced portions, of a plate adapted to bear upon the front surface of said bumper bars, said plate having a lug extending between said bars and adapted to bear upon the inner surface of the connection between said bars and to prevent longitudinal movement thereof, and means for clamping said plate to said bars.

14. The combination with a pair of impact bars spaced apart at their ends and pivotally connected to an auxiliary bar, of a mask plate adapted to bear upon the front surfaces of said impact bars and having a portion adapted to bear upon the ends thereof, clamp means including a bolt passing between said impact bars and a plate adapted to bear upon their rear surfaces, said mask plate having a lug projecting between said impact bars and bearing upon the inner surface of said pivotal connection and having a pair of lugs adapted to extend between said impact bars and positioned to prevent rotation of said clamping plate.

15. A vehicle bumper including a pair of front bars having their end portions spaced apart and having eyes at their ends for pivotal connection to a rear bar, one or both of said front bars having its outer edge cut down and forming an eye of reduced width, a bolt adapted to be positioned in said eyes and to pivotally connect the front bars to the rear bar, a plate adapted to be positioned upon the surface of said front bars and having one or more flanges projecting over the reduced edge or edges of said bar or bars, and means for clamping said plate to said bars.

In testimony whereof, I hereunto affix my signature.

HERBERT S. JANDUS.